United States Patent
Feininger et al.

(10) Patent No.: US 10,019,770 B2
(45) Date of Patent: Jul. 10, 2018

(54) SYSTEM AND METHOD FOR GENERATING AND TRANSMITTING DATA WITHOUT PERSONALLY IDENTIFIABLE INFORMATION

(71) Applicant: FourthWall Media, Inc., Dulles, VA (US)

(72) Inventors: William Feininger, Palm Harbor, FL (US); Eric H. Davis, Potomac Falls, VA (US)

(73) Assignee: FOURTHWALL MEDIA, INC., Dulles, VA (US)

( * ) Notice: Subject to any disclaimer, the term of this patent is extended or adjusted under 35 U.S.C. 154(b) by 0 days.

(21) Appl. No.: 14/310,086

(22) Filed: Jun. 20, 2014

(65) Prior Publication Data

US 2014/0379599 A1   Dec. 25, 2014

Related U.S. Application Data

(60) Provisional application No. 61/837,424, filed on Jun. 20, 2013.

(51) Int. Cl.
*H04N 7/16*          (2011.01)
*G06Q 50/26*         (2012.01)
(Continued)

(52) U.S. Cl.
CPC ........... *G06Q 50/265* (2013.01); *G06Q 10/10* (2013.01); *H04L 63/0421* (2013.01);
(Continued)

(58) Field of Classification Search
CPC ........... H04N 21/4622; H04N 21/6582; H04N 21/25891; H04N 60/45
(Continued)

(56) References Cited

U.S. PATENT DOCUMENTS 6,574,611 B1 *  6/2003  Matsuyama  ............ G06F 21/10
                                                     380/30
7,181,438 B1 *  2/2007  Szabo  ............... G06F 17/30522
(Continued)

FOREIGN PATENT DOCUMENTS

WO    WO 2014-082749       6/2014

OTHER PUBLICATIONS

International Search Report with Written Opinion from PCT/US2014/043377 dated Dec. 31, 2014.

*Primary Examiner* — Annan Shang
(74) *Attorney, Agent, or Firm* — Hunton & Williams LLP

(57) ABSTRACT

A system and method for generating and transmitting data without personally identifiable information. The method may include receiving a set of one or more unique identifiers (IDs) and a first set of data associated with a subscriber. The method may send the IDs to a third party provider of datasets. The method may receive a second set of data associated with the subscriber identified using the unique IDs. The method may generate aggregated viewing data based on the first and second sets of data. The set of unique IDs may be based on a one-way hash of personally identifiable information associated with the subscriber. In this way, the unique IDs may be appended with the data from third party providers so additional information regarding the household is available to clients, but the personally identifiable information is unavailable to any of the parties.

11 Claims, 3 Drawing Sheets

(51) Int. Cl.
*G06Q 10/10* (2012.01)
*H04N 21/478* (2011.01)
*H04N 21/254* (2011.01)
*H04N 21/258* (2011.01)
*H04L 29/08* (2006.01)
*H04L 29/06* (2006.01)

(52) U.S. Cl.
CPC .............. *H04L 67/20* (2013.01); *H04L 67/22* (2013.01); *H04N 21/254* (2013.01); *H04N 21/25883* (2013.01); *H04N 21/478* (2013.01)

(58) Field of Classification Search
USPC .................. 725/9, 10, 13, 93, 116; 709/224
See application file for complete search history.

(56) References Cited

U.S. PATENT DOCUMENTS

| | | | | |
|---|---|---|---|---|
| 7,353,541 B1* | 4/2008 | Ishibashi | ................. | G06F 21/10 348/E7.056 |
| 7,587,731 B1* | 9/2009 | Oyabu | ................... | G08C 17/00 370/331 |
| 7,690,006 B2* | 3/2010 | Birnbaum | ......... | H04N 21/4345 719/328 |
| 7,716,662 B2* | 5/2010 | Seiden | ...................... | G06F 8/61 717/173 |
| 8,458,168 B2* | 6/2013 | Surendran et al. | ........... | 707/722 |
| 8,489,669 B2* | 7/2013 | Johnson | .............. | H04W 76/021 709/203 |
| 8,595,781 B2* | 11/2013 | Neumeier | .......... | H04N 5/44591 707/769 |
| 8,615,778 B1* | 12/2013 | Evans | .............. | H04N 21/25891 725/119 |
| 8,718,100 B2* | 5/2014 | Markley | ........................ | 370/389 |
| 8,732,760 B2* | 5/2014 | Jeong | ................ | H04N 7/17363 725/11 |
| 8,863,165 B2* | 10/2014 | Gordon | ................ | H04N 21/254 725/116 |
| 9,015,151 B1* | 4/2015 | Margulis | ............ | G06Q 30/0269 705/14.52 |
| 9,049,259 B2* | 6/2015 | Rathod | ............ | H04N 21/44222 |
| 9,369,471 B2* | 6/2016 | Zent | ...................... | H04L 63/104 |
| 2006/0015580 A1* | 1/2006 | Gabriel | .............. | H04N 7/17309 709/219 |
| 2006/0168609 A1* | 7/2006 | Chen | ...................... | H04H 60/64 725/9 |
| 2007/0157220 A1* | 7/2007 | Cordray | ................. | H04H 60/65 725/9 |
| 2007/0157262 A1* | 7/2007 | Ramaswamy | ......... | H04H 20/14 725/87 |
| 2007/0233670 A1* | 10/2007 | Suzuki | .............. | G06F 17/30011 |
| 2009/0055852 A1 | 2/2009 | Sardera | | |
| 2009/0157262 A1* | 6/2009 | Lee | ........................ | B60T 8/1755 701/42 |
| 2010/0057560 A1* | 3/2010 | Skudlark | ................ | G06Q 30/02 705/14.49 |
| 2010/0094758 A1 | 4/2010 | Chamberlain et al. | | |
| 2011/0314502 A1* | 12/2011 | Levy | ...................... | H04N 7/106 725/46 |
| 2012/0011551 A1* | 1/2012 | Levy | ...................... | H04N 7/106 725/82 |
| 2012/0042343 A1* | 2/2012 | Laligand | .......... | H04N 21/23433 725/53 |
| 2012/0089996 A1* | 4/2012 | Ramer | ................... | H04H 60/46 725/14 |
| 2012/0095834 A1* | 4/2012 | Doig | ................. | G06Q 30/0255 705/14.53 |
| 2012/0323717 A1* | 12/2012 | Kirsch | ............... | G06Q 20/0855 705/26.1 |
| 2013/0132854 A1* | 5/2013 | Raleigh | ................. | G06F 3/0482 715/738 |
| 2013/0332987 A1* | 12/2013 | Tenneti | .................... | G06F 21/10 726/1 |
| 2014/0006951 A1* | 1/2014 | Hunter | ................... | H04H 60/31 715/719 |
| 2014/0051046 A1* | 2/2014 | Paul | ........................ | G09B 7/02 434/236 |
| 2014/0366075 A1* | 12/2014 | Issa | .................. | G06F 17/30817 725/116 |
| 2014/0379599 A1* | 12/2014 | Feininger | ............. | H04N 21/254 705/325 |
| 2014/0380053 A1* | 12/2014 | Libonate | ................ | H04L 43/16 713/170 |
| 2016/0042157 A1* | 2/2016 | Drope | ............... | G06F 17/30017 713/165 |
| 2016/0087933 A1* | 3/2016 | Johnson | .................. | H04W 4/70 709/245 |
| 2017/0244746 A1* | 8/2017 | Hawthorn | ........... | H04L 63/1433 |

* cited by examiner

SYSTEM AND METHOD FOR GENERATING AND TRANSMITTING DATA WITHOUT PERSONALLY IDENTIFIABLE INFORMATION

CROSS-REFERENCE TO RELATED APPLICATIONS

The present application claims priority to U.S. Provisional Patent Application No. 61/837,424, filed Jun. 20, 2013, which is hereby incorporated by reference in its entirety.

TECHNICAL FIELD

The present disclosure relates to systems and methods for transmitting data and, more particularly, to systems and methods for transmitting data without personally identifiable information.

BACKGROUND

Personally identifiable information, sometimes referred to as personally identifying information, is any information that can be used to identify, distinguish, locate, or contact an individual. Such information may include, for example, an individual's name, address, social security number, date and place of birth, mother's maiden name, financial information (e.g., debit card numbers, credit card numbers, banking information, etc.), employer names, biometric records, and medical, educational, financial, and employment information. Protecting an individual's personally identifiable information can inhibit the ability of malicious parties from causing physical, economic, and emotional harm to the individual.

The disclosed embodiments are directed to overcoming one or more of the problems set forth above.

SUMMARY

In one example embodiment, the present disclosure is directed to a method for creating household identifiers that allow matching of disparate datasets between subscribers of a pay television service and a variety of third party datasets. These may include household demographics, purchase habits, or other consumer behaviors. The television service provider submits household names and addresses (and/or other personally identifiable information) to software that is run within the cable company. The output of the software is a series of household identifiers that are one-way hashed and cannot be reversed so as to identify the subscribers by name and/or address (or other personally identifiable information). These identifiers are transmitted to a data service provider in lieu of any personally identifiable information and used to associate viewing behaviors to the IDs. The IDs are then sent to one or more third party consumer data providers (matching services) that create household identifiers from their datasets, and place the information in a safe harbor so that they are unable to associate the household with names/addresses. Identifiers that match between the third party and data service providers are appended with the data from the third party so additional information regarding the household is available to marketers, but the personally identifiable information is still unavailable to any of the parties.

In another example embodiment, the present disclosure is directed to a system for creating household identifiers that allow matching of disparate datasets between subscribers of a pay television service and a variety of third party datasets. These may include household demographics, purchase habits, or other consumer behaviors. The television service provider submits household names and addresses (and/or other personally identifiable information) to software that is run within the cable company. The output of the software is a series of household identifiers that are one-way hashed and cannot be reversed so as to identify the subscribers by name and/or address (or other personally identifiable information). These identifiers are transmitted to data service providers in lieu of any personally identifiable information and used to associate viewing behaviors to the IDs. The IDs are then sent to one or more third party consumer data providers (matching services) that create household identifiers from their datasets, and place the information in a safe harbor so that they are unable to associate the household with names/addresses. Identifiers that match between the third party and data service providers are appended with the data from the third party so additional information regarding the household is available to marketers, but the personally identifiable information is still unavailable to any of the parties.

In another example embodiment, the present disclosure is directed to a computer-implemented method. The computer-implemented method includes creating, using a processor, one or more unique identifiers (IDs), wherein the one or more unique IDs are associated with a subscriber location; generating, using the processor, a subscriber file, wherein the subscriber file includes the one or more unique IDs and subscriber data; transmitting the subscriber file to a data processor; and receiving, from the data processor, aggregated viewership data.

The computer-implemented method further includes transmitting, to the data processor, set-top box data corresponding to viewing habits at the subscriber location.

The computer-implemented method further includes creating the one or more unique IDs based on one or more combinations of a subscriber name and a subscriber address.

The computer-implemented method further includes generating a one-way hash value based on at least one of a subscriber name and subscriber address.

The computer-implemented method further includes generating a one-way hash value using at least one of a subscriber name and subscriber address.

The computer-implemented method further includes wherein the subscriber file is free of personally identifiable information.

The computer-implemented method further includes wherein the personally identifiable information includes one or more of a name, an address, a social security number, a date of birth, a credit card number, employment information, and biometric data.

In another example embodiment, the present disclosure is directed to a system comprising memory storing data and instructions and at least one processor configured to access the memory and execute the instructions. The at least one processor is configured to create one or more unique identifiers (IDs), wherein the one or more unique IDs are associated with a subscriber location; generate a subscriber file, wherein the subscriber file includes the one or more unique IDs and subscriber data; transmit the subscriber file to a data processor; and receive, from the data processor, aggregated viewership data.

The at least one processor of the system is further configured to transmit, to the data processor, set-top box data corresponding to viewing habits at the subscriber location.

The at least one processor of the system is further configured to create the one or more unique IDs based on one or more combinations of a subscriber name and a subscriber address.

The at least one processor of the system is further configured to generate a one-way hash value based on at least one of a subscriber name and subscriber address.

The at least one processor of the system is further configured to generate a one-way hash value using at least one of a subscriber name and subscriber address.

The at least one processor of the system is further configured to generate a subscriber file that is free of personally identifiable information, including one or more of a name, an address, a social security number, a date of birth, a credit card number, employment information, and biometric data.

In another example embodiment, the present disclosure is directed to a computer-implemented method comprising: creating, using a processor, one or more unique identifiers (IDs) based on one or more combinations of a subscriber name and a subscriber address; generating, using the processor, a subscriber file using a one-way hash process, wherein the subscriber file includes the one or more unique IDs and subscriber data; and transmitting the subscriber file to a data processor for data aggregation.

The computer-implemented method further includes transmitting, to the data processor, set-top box data corresponding to viewing habits at the subscriber location.

The computer-implemented method further includes generating a subscriber file using a one-way hash process based on at least one of a subscriber name and subscriber address.

The computer-implemented method further includes a subscriber file that is free of personally identifiable information, wherein the personally identifiable information includes one or more of a name, an address, a social security number, a date of birth, a credit card number, employment information, and biometric data.

The computer-implemented method further includes receiving, from the data processor, aggregated viewership data.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION

Figure 1:
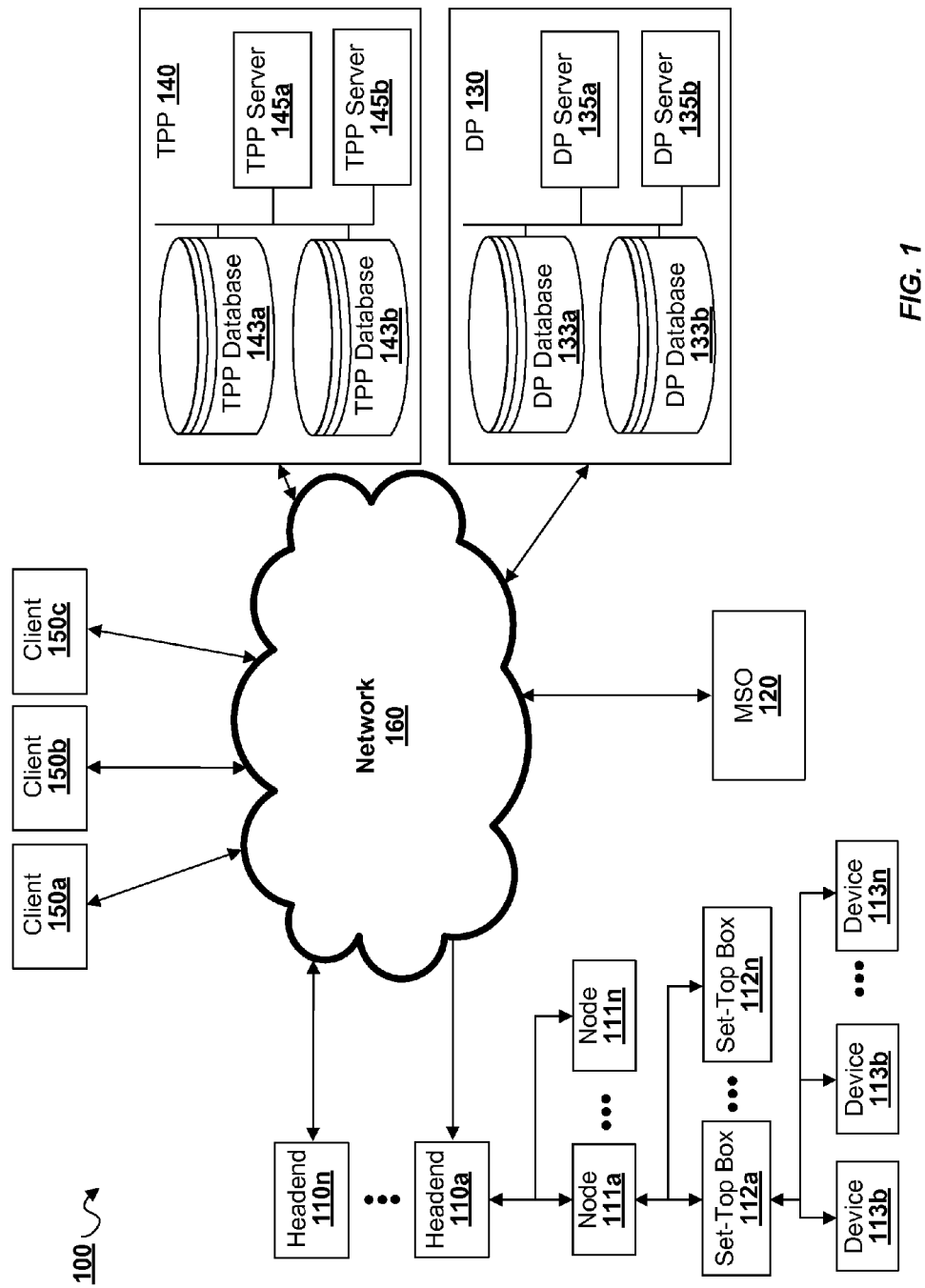
FIG. 1 is a diagram illustrating an example system for generating and transmitting data without personally identifiable information, consistent with certain disclosed embodiments.

The following description is intended to convey a thorough understanding of the embodiments described by providing a number of specific exemplary embodiments and details involving systems and methods for generating and transmitting data without personally identifiable information. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in various embodiments, depending on specific design and other needs. A multiple system operator (MSO), such as, for example, a cable media MSO, is used in the examples of the disclosure. However, the disclosure is not intended to be limited to MSOs only. Instead, the disclosed system and method can be extended to any entity that seeks to transmit data without including personally identifiable information without departing from the spirit and scope of the disclosure.

According to the various embodiments of the present disclosure, systems and methods are disclosed to generate and transmit data without including personally identifiable information. The systems and methods depicted in FIGS. 1 through 3 allow MSOs to manage the subscriber data processes in a manner consistent with applicable privacy laws, regulations, standards, and expectations. In one example embodiment, the systems and methods of the disclosure are configured to operate in connection with a user agent (e.g., a set top box, a cable card, etc.), which allows a user to access media content. In such an embodiment, the system may include one or more client applications stored in memory of one or more user agents, and the memory may be accessed and the stored application executed by one or more computer processors of the user agents. The system may further include one or more corresponding server applications and one or more cloud-based analytics and reporting services, which may be operated by data service providers. The data service providers may integrate raw subscriber data (e.g., media and/or other data provided to the end user) with third party provider datasets to provide granular and detailed set top box datasets that may further be made available to research reports for MSOs, audience research clients, etc. These datasets may include rich sets of demographic characteristics associated with households served by the MSOs.

Additionally, a unique identifier may be created and associated with each household. The MSO or a third party, such as a third party matching service, may create the unique identifiers. In one example, a third party matching service may create unique identifiers from a name and postal address pair. Thereafter, household and their demographics may be referred to by the unique identifier. In one embodiment, the process of creating unique identifiers may be executed more than one time and by at least two entities (e.g., MSOs, third party matching services, etc.).

FIG. 1 is a diagram illustrating an example system for generating and transmitting data that does not include personally identifiable information, consistent with certain disclosed embodiments. As shown in FIG. 1, an example system 100 may include one or more headend devices 110 (e.g., headend device 110a through headend device 110n), one or more node devices 111 (e.g., node device 111a through node device 111n), one or more set-top boxes (e.g., set-top box 112a through set-top box 112n), one or more end user devices 113 (e.g., end user device 113a through end user device 113n), at least one multiple system operator (MSO) 120, at least one data processor (DP) 130, at least one third party provider (TPP) 140, one or more clients 150 (e.g., client 150a, client 150b, and client 150c), and network 160.

Figure 2:
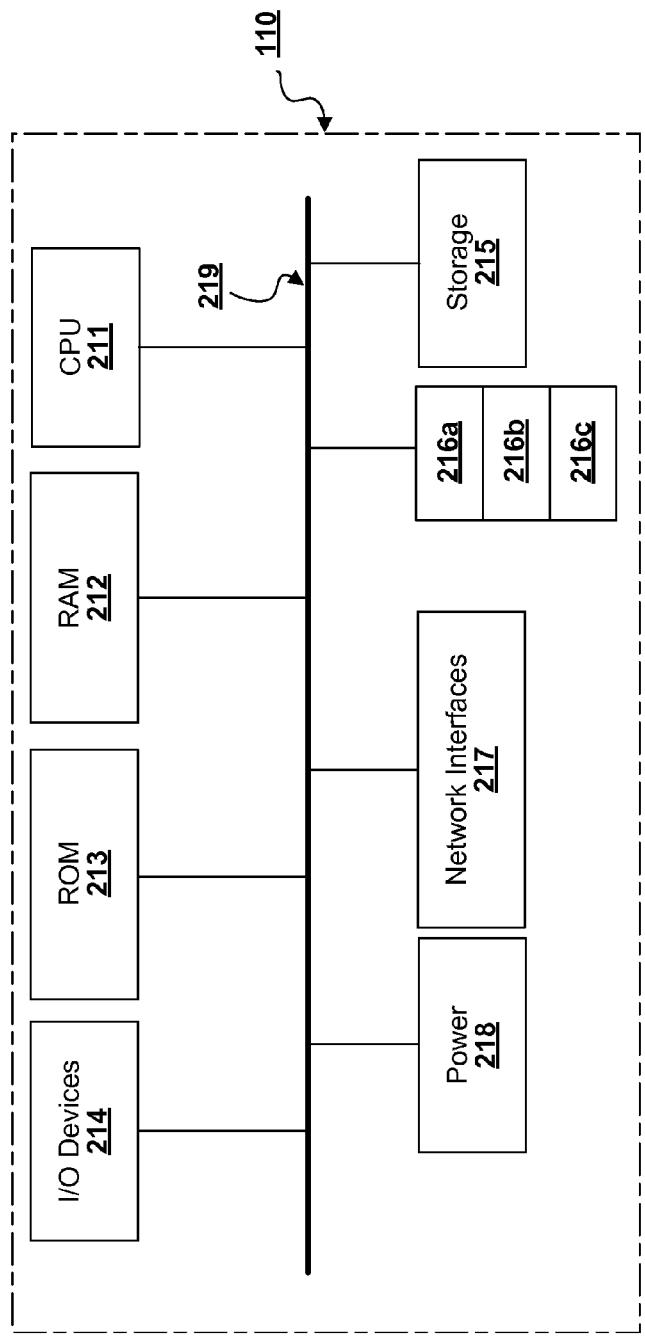
FIG. 2 is a diagram illustrating an example headend device for generating and transmitting data without personally identifiable information, consistent with certain disclosed embodiments.

Headend devices 110 may be any type of electronic device and/or component configured to execute one or more processes, many of which are known in the art. Headend devices 110 can include, by way of example and not limitation, one or more server computers, one or more client computers, network computers, workstations, base stations or access devices, or any component or sub-component of another headend device 110 or assemblage. As depicted in FIG. 2, headend devices 110 can include one or more memory devices (e.g., RAM, ROM, databases, etc.) configured to store computer-executable code and/or data, and one or more computer processors configured to access the one or more memory device and execute the computer-executable code and/or stored data. Headend devices 110 may be configured to transmit and/or receive information to and/or from other node devices 111, set-top boxes 112, end user devices 113, MSOs 120, DPs 130, TPPs 140, clients 150 via any combination of wired and/or wireless communication systems, method, and devices, including, for example, network 160.

Each headend 110 may be associated with one or more node devices 111. Node devices 111 may be any type of electronic device and/or component configured to execute one or more processes, many of which are known in the art. Node devices 111 can include, by way of example and not limitation, one or more server computers, one or more client computers, network computers, workstations, base stations or access devices, or any component or sub-component of another node devices 111 or assemblage. Although not illustrated, node devices 111 can also include one or more memory devices (e.g., RAM, ROM, databases, etc.) configured to store computer-executable code and/or data, and one or more computer processors configured to access the one or more memory device and execute the computer-executable code and/or stored data. Node devices 111 may be configured to transmit and/or receive information to and/or from other node devices 111, set-top boxes 112, end user devices 113, MSOs 120, via any combination of wired and/or wireless communication systems, method, and devices.

Each node 111 may have one or more associated set-top box 112. Set-top boxes 112 may be any type of electric electronic device and/or component configured to execute one or more processes, many of which are known in the art. Set-top boxes 112 can include, by way of example and not limitation, one or more memory devices (e.g., RAM, ROM, databases, etc.) configured to store computer-executable code and/or data, and one or more computer processors configured to access the one or more memory device and execute the computer-executable code and/or stored data. Set-top boxes 112 may be configured to transmit and/or receive information to and/or from other node devices 111, set-top boxes 112, end user devices 113, MSOs 120, via any combination of wired and/or wireless communication systems, method, and devices. Although referred to as set-top boxes 112, the term "set-top box" may refer to any device (e.g., set-top box, set-top unit, cable box, cable modem, game console, cable card, television adapters, IP television receivers, etc.) configured and/or capable of providing media and data signals to end-user devices 113, such as, for example, television, printers, computers, music players, telephones (e.g., Voice over Internet Protocol (VoIP) phones, etc.), digital video recorders, etc. It is further noted that set-top boxes 112 and end-user devices 113 may be integrated together into one or more devices that share components.

One or more headend devices 110 may be communicatively coupled to an MSO 120 such that MSO 120 may provide media and data signals for further transmission to nodes 111, set-top boxes 112, and devices 113. MSO 120 may be, for example, an operator of multiple cable or direct-broadcast satellite television stations. Although not illustrated, MSOs 120 can include one or more memory devices (e.g., RAM, ROM, databases, etc.) configured to store computer-executable code and/or data (e.g., billing/subscriber data), and one or more computer processors configured to access the one or more memory device and execute the computer-executable code and/or stored data. MSOs 120 may be configured to transmit and/or receive information to and/or from other headend devices 110, node devices 111, set-top boxes 112, end user devices 113, MSOs 120, via any combination of wired and/or wireless communication systems, method, and devices, including, for example, network 160.

DP 130 may be any entity configured to generate, transmit, and/or utilize data that does not include personally identifiable information. DP 130 may include one or more DP servers 135 (e.g., DP server 135*a* and DP server 135*b*). DP servers 135 can be physical computers, or computer systems, configured to run one or more services to support users of other computers on one or more networks and/or computer programs executing on physical computers, or computer systems, and configured to serve the requests of other programs that may be operating on one or more servers (not shown) or on other computing devices, such as client computing devices. DP servers 135 can include, by way of example and not limitation, communication servers, database servers, fax servers, file servers, mail servers, print servers, name servers, web servers, proxy servers, gaming servers, etc. In some aspects, DP servers 135 may be configured to transmit and/or receive information to and/or from clients 150, TPPs 140, MSOs 120, headend devices 110, nodes 111, set-top boxes 112, devices 113, other DPs 135 (not shown), Internet Service Providers (ISP) servers (not shown), and/or databases (e.g., DP databases 133 and TPP databases 143) directly and/or indirectly via any combination of wired and/or wireless communication systems, method, and/or devices, including, for example, network 160. DP servers 135 may include one or more physical servers or server systems and/or one or more proxy servers, each configured to run one or more services to support other computers or computer systems, such as, for example, client computer systems (not shown). In certain embodiments, the same server devices may perform the roles of physical DP servers 135 and/or proxy DP servers 135.

DP 130 may also include one or more DP databases 133 (e.g., DP database 133*a* and DP server 133*b*, as illustrated in FIG. 1). DP databases 133 can be one or more computing devices configured to store databases, e.g., organized collections of data and their data structures, and/or execute database management systems, e.g., computer programs configured to control the creation, maintenance, and use of the database. Collectively, databases and their database management systems can be referred to as database systems. As used herein, DP database 133 can refer to databases, database management systems, and/or database systems. In some aspects, DP database 133 can be configured to store databases, while database management systems are stored and executed on one or more remote computing devices, such as headend 110, and/or one or more remote servers, such as DP servers 135. In one implementation, DP databases 133 can include software database programs configured to store data associated with DP servers 135 and their associated applications or processes, such as, for example, standard databases or relational databases. DP databases 133 can include relationship database management systems (RDBMS) that may be configured to run as a server on DP servers 135. In some embodiments, DP databases 133 can be configured to transmit and/or receive information to and/or from headend devices 110, nodes 111, set-top boxes 112, end user devices 113, MSOs 120, TPPs 140, TPP databases 143, TPP servers 145, clients 150, DP servers 135, and/or other DPs 130, DP databases 133 and DP servers 135 directly and/or indirectly via any combination of wired and/or wireless communication systems, method, and/or devices, including, for example, network 160.

TPP 140 may be any entity configured to generate, transmit, and/or utilize data that does not include personally identifiable information. TPP 140 may include one or more TPP servers 145 (e.g., TPP server 145a and TPP server 145b, as illustrated in FIG. 1). TPP servers 145 can be physical computers, or computer systems, configured to run one or more services to support users of other computers on one or more networks and/or computer programs executing on physical computers, or computer systems, and configured to serve the requests of other programs that may be operating on one or more servers (not shown) or on other computing devices, such as client computing devices. TPP servers 145 can include, by way of example and not limitation, communication servers, database servers, fax servers, file servers, mail servers, print servers, name servers, web servers, proxy servers, gaming servers, etc. In some aspects, TPP servers 145 may be configured to transmit and/or receive information to and/or from clients 150, DPs 130, MSOs 120, headend devices 110, nodes 111, set-top boxes 112, devices 113, other TPPs 140 (not shown), Internet Service Providers (ISP) servers (not shown), and/or databases (e.g., TPP databases 143) directly and/or indirectly via any combination of wired and/or wireless communication systems, method, and/or devices, including, for example, network 160. TPP servers 145 may include one or more physical servers or server systems and/or one or more proxy servers, each configured to run one or more services to support other computers or computer systems, such as, for example, client computer systems (not shown). In certain embodiments, the same server devices may perform the roles of physical TPP servers 145 and/or proxy TPP servers 145.

TPP 140 may also include one or more TPP databases 143 (e.g., TPP database 143a and TPP server 143b). TPP databases 143 can be one or more computing devices configured to store databases, e.g., organized collections of data and their data structures, and/or execute database management systems, e.g., computer programs configured to control the creation, maintenance, and use of the database. Collectively, databases and their database management systems can be referred to as database systems. As used herein, TPP databases 143 can refer to databases, database management systems, and/or database systems. In some aspects, TPP databases 143 can be configured to store databases, while database management systems are stored and executed on one or more remote computing devices, such as headend 110, MSO 120, DPs 130, and/or one or more remote servers, such as TPP servers 145 and DP servers 135. In one implementation, TPP databases 143 can include software database programs configured to store data associated with TPP servers 145 and their associated applications or processes, such as, for example, standard databases or relational databases. TPP databases 143 can include relationship database management systems (RDBMS) that may be configured to run as a server on TPP servers 145. In some embodiments, TPP databases 143 can be configured to transmit and/or receive information to and/or from headend devices 110, nodes 111, set-top boxes 112, end user devices 113, MSOs 120, DPs 130, DP databases 133, DP servers 135, TPP server 145, and/or other TPPs 140, TPP databases 143 and TPP servers directly and/or indirectly via any combination of wired and/or wireless communication systems, method, and/or devices, including, for example, network 160.

Clients 150 may be data and/or research clients 150 which consume aggregated viewership data 330 for purposes such as audience analysis, marketing, and advertising. Although not illustrated, clients 150 can include one or more memory devices (e.g., RAM, ROM, databases, etc.) configured to store computer-executable code and/or data, and one or more computer processors configured to access the one or more memory device and execute the computer-executable code and/or stored data. Clients 150 may be configured to transmit and/or receive information to and/or from other headend devices 110, node devices 111, set-top boxes 112, end user devices 113, MSOs 120, DPs 130, and TPPs 140 via any combination of wired and/or wireless communication systems, method, and devices, including, for example, network 160.

Network 160 may be any suitable network or other communication link that allows communication between or among one or more computing systems and/or devices, such as, for example, devices 113, set-top boxes 112, nodes 111, headend devices 110, MSOs 120, DPs 130, DP databases 133, DP servers 135, TPP 140, TPP 143, TPP 145, and clients 150. Network 160 may be wired, wireless, or any combination thereof. Network 160 may include one or more of a fiber optics network, a passive optical network, a cable network, an Internet network, a satellite network, a wireless LAN, a Global System for Mobile Communication (GSM), a Personal Communication Service (PCS), a Personal Area Network (PAN), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 160 may include, without limitation, telephone lines, fiber optics, IEEE Ethernet 902.3, a wide area network (WAN), a local area network (LAN), or a global network such as the Internet. In addition, network 160 may support an Internet network, a wireless communication network, a cellular network, or the like, or any combination thereof. Network 160 may further include one network, or any number of the exemplary types of networks mentioned above, operating as a stand-alone network or in cooperation with each other. Network 160 may utilize one or more protocols of one or more network elements to which they are communicatively coupled. Network 160 may translate to or from other protocols to one or more protocols of network devices. Although network 160 is depicted as a single network, it should be appreciated that according to one or more embodiments, network 160 may comprise a plurality of interconnected networks, such as, for example, the Internet, a service provider's network, a cable television network, corporate networks, and home networks.

Although FIG. 1 depicts communication between the disclosed elements using indirect network connections, such as a connection through network 160, those skilled in the art will appreciate the disclosed elements may also communicate with one another using one or more direct communications link and/or a communications link separate from network 140. In the embodiment of FIG. 1, the disclosed elements may communicate with one another via network 160 using standard protocols, such as, for example, File Transfer Protocol (FTP), Hypertext Transfer Protocol (HTTP), Transmission Control Protocol (TCP), Internet Protocol (IP), etc., as well as other related and/or corresponding protocols. For example, HTTP requests from DPs 130 may be encapsulated in TCP segments, IP datagrams, and Ethernet frames and transmitted to MSOs 120. In some embodiments, third parties may participate as intermediaries in the communication, such as, for example, Internet Service Providers (ISPs) or other entities that provide routers and link layer switches. Such third parties may not, however, analyze or review the contents of the Ethernet frames beyond the link layer and the network layer, but instead analyze only those parts of the packet necessary to route communications from, for example, DPs 130 to MSOs 120.

FIG. 2 is a block diagram of an example device, such as, for example, headend device 110, node 111, set-top box 112, or device 113, consistent with certain disclosed embodiments. It should be readily apparent that the example device depicted in FIG. 2 represents a generalized schematic illustration and that other components/devices can be added, removed, or modified. In one example embodiment, the device depicted in FIG. 2 can be configured to include address translation and full virtual-memory services. Although the device illustrated in FIG. 2 may be any of headend device 110, node 111, set-top box 112, and/or device 113, for the purpose of simplicity and clarity of description, the example device shown in FIG. 2 will be referred to as a headend device 110.

As shown in FIG. 2, each headend device 110 can include one or more of the following components: at least one central processing unit (CPU) 211 configured to execute computer program instructions to perform various processes and methods, random access memory (RAM) 212 and read only memory (ROM) 213 configured to access and store data and information and computer program instructions, I/O devices 214 configured to provide input and/or output to headend device 110 (e.g., keyboard, mouse, display, speakers, printers, modems, network cards, etc.), and storage media 215 or other suitable types of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system 216a, application programs 216b including, for example, web browser application, email application and/or other applications, and data files 216c are stored.

In addition, each headend device 110 can include network interfaces 217 (including one or more antennas) that provide wireless and/or wire line digital and/or analog interface to one or more networks, such as network 140, over one or more network connections, a power source 218 that provides an appropriate alternating current (AC) or direct current (DC) to power one or more components of headend device 110, and a bus 219 that allows communication among the various disclosed components of headend device 110 of FIG. 2. Each of these components is well-known in the art and will not be discussed further.

Although not shown, headend device 110 can include one or more mechanisms and/or devices by which headend device 110 can perform the methods as described herein. For example, headend device 110 can include one or more encoders, one or more decoders, one or more interleavers, one or more circular buffers, one or more multiplexers, one or more de-multiplexers, one or more permuters, one or more decryption units, one or more demodulation units, one or more arithmetic logic units and/or their constituent parts, etc. These mechanisms and/or devices can include any combination of hardware and/or software components and can be included, in whole or in part, in any of the components shown in FIG. 2.

In one or more example designs of headend device 110 of FIG. 2, the functions described can be implemented in hardware, software, firmware, or any combination thereof. If implemented in software, the functions can be stored as one or more instructions or executable code on computer-readable medium, including the computer-readable medium described above (e.g., RAM 212, ROM 213, and storage media 215), which can be accessed by a computer processor, such as, for example, CPU 211.

Figure 3:
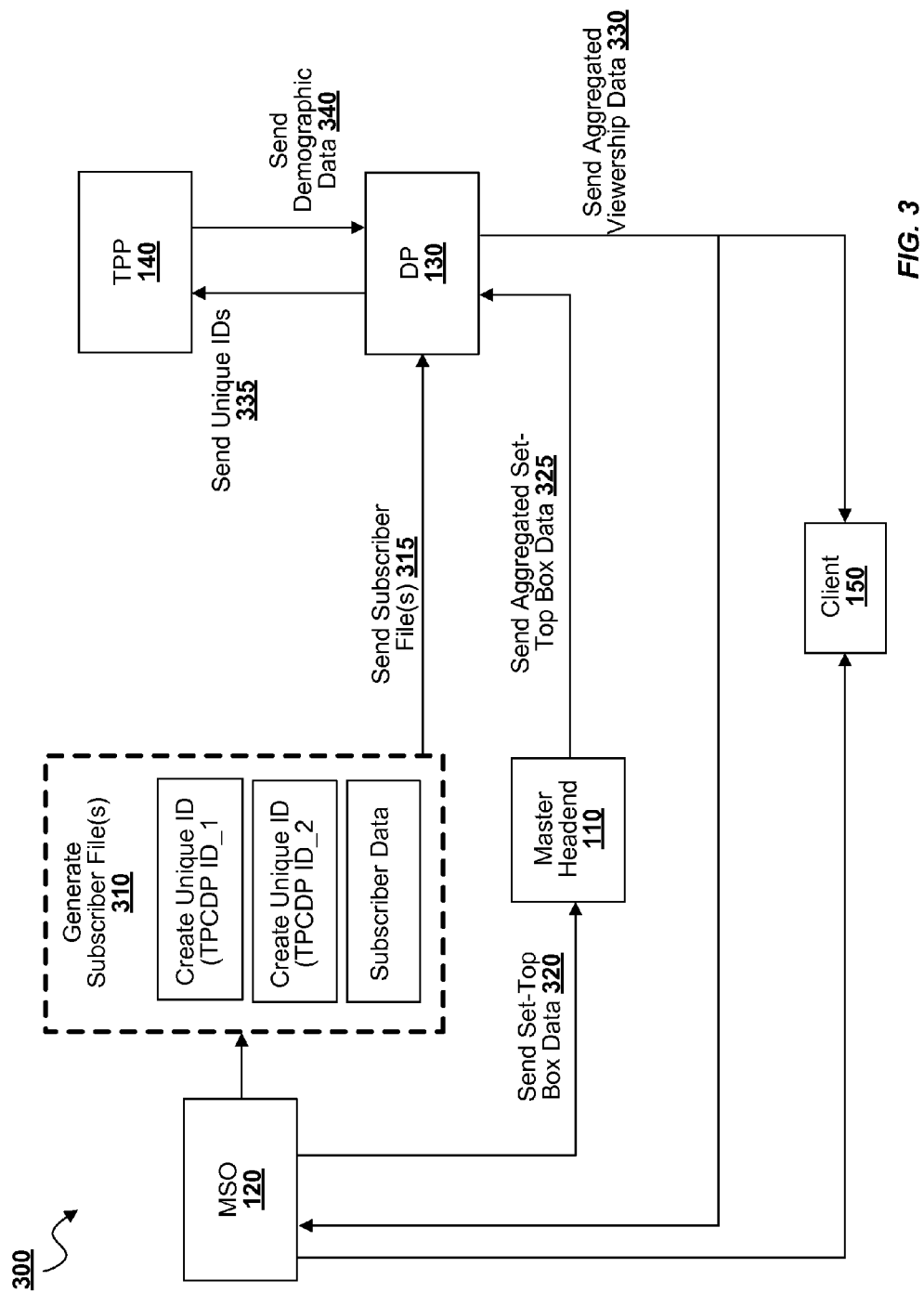
FIG. 3 is a flowchart illustrating an example method of generating and transmitting data without personally identifiable information, consistent with certain disclosed embodiments.

FIG. 3 is an exemplary flowchart 300 illustrating generation and transmission of data that does not include personally identifiable information, consistent with certain disclosed embodiments. Specifically, FIG. 3 illustrates an embodiment in which an MSO 120 generates subscriber data and transmits the generated subscriber data to DP 130. Utilizing information provided by a master headend 110, one or more MSOs 120, and one or more TPPs 140, DP 130 can provide aggregated viewership data to one or more MSOs 120, TPPs 140, and/or clients 150.

As shown in FIG. 3, one or more subscriber files are generated (310). The one or more subscriber files may be generated by an application executing by/at MSO 120. Additionally and/or alternatively, the one or more subscriber files may be generated by an application executing by/at one or more DPs 130, one or more TPPs 140, etc. In one example embodiment, the one or more subscriber files may be generated using one or more third party consumer data providers IDs (e.g., TPCDP ID_1, TPCDP ID_2, etc.) and subscriber data. The subscriber data may be obtained from the subscriber management systems of MSOs 120, and the required input data fields for this hashing process may include, for example, subscriber first and last name, subscriber residential and/or postal address corresponding to the location of service, a unique and persistent subscriber identifier created by MSO 120, etc. A subscriber may be any entity, including persons, groups of persons, business, etc., who accesses and/or uses the systems and methods disclosed herein.

MSO 120 may generate one or more subscriber files using an application configured to generate one or more unique subscriber identification (IDs) and/or utilize one or more previously generated unique subscriber IDs. The unique subscriber IDs may each correspond to a household and/or its individual occupants. In certain aspects, the subscriber file may be generated on a periodic basis (e.g., monthly, weekly, daily, etc.) using software created and/or utilized by MSO 120.

In some aspects, one or more third party consumer data providers (e.g., TPP 140) may create unique third party consumer data provider (TPCDP) IDs (e.g., TPCDP ID_1, TPCDP ID_2, etc.) using dedicated systems and processes. Thus, the dedicated systems and processes may be configured to create one-way hashed values (e.g., TPCDP ID_1, TPCDP ID_2, etc.) using subscriber names and/or addresses such that the one-way hashed values can uniquely identify the viewer households without passing the personally identifiable information of a subscriber to MSO 120. For example, third party consumer data providers may create one or more unique identifiers by using end user or subscriber name and address combinations utilizing, for example, a 64-bit dynamic link library (DLL) that creates a hashed value from the input data.

Alternatively and/or additionally, third party consumer data providers may create one or more unique identifiers by using a cryptographic algorithm (e.g., SHA-0, SHA-1, GOST, MD2, MD4, MD5, HAVAL, PANAMA, etc.). In either case, the identifier creation process is a one way hash and cannot be reversed. The ID creation processes may be implemented using a single application and/or multiple applications running on WINDOWS™, Unix/Linux, or other operating systems, and may incorporate additional fields including, for example, account numbers, device IDs, ZIP codes, employees, employers, billing status, franchise name, headend name and/or ID, zone, zone name, media subscriptions (e.g., HBO, TMC, Cinemax, Showtime, Starz!, etc.), tier, HDTV, etc.

The data elements and cryptographic algorithms used to create the TPCDP IDs may be known to the individual TPCDPs and kept secret to prevent compromise by nefarious third parties. For added security, additional secret keys may be used together with personally identifiable information as "salt" to render TPCDP IDs even more secure. As used herein, the term "salt" refers to data that may be used as an additional input to a function, typically a one-way function, that hashes a password or passphrase. In some embodiments, the "salt" and the TPCDP IDs may be concatenated and processed with a cryptographic hash function, and the resulting output may be stored, along with the salt, in a database. Subscriber data associated with the TPCDP IDs is additional information about the household which may include, for example, a household identifier, set top box identifiers, and other information as subsequently discussed, but including no personally identifiable information.

The household identifier is a unique and persistent identifier corresponding to each subscriber household. Since households may have more than one set top box 113, there may be several records in the file with the same uniquely-created household ID. Each record may include a set top identifier, where the set top box identifier is unique and may be considered the "key field." A set top box identifier (e.g., a unique ID corresponding to each set-top box 113) may include, for example, the MAC address (also known as the Unit Identifier on a Motorola DAC). In some embodiments, the MAC address may take the form of, for example, "00019f43a8bc", "00:01:9f:43:a8:bc," or "000-03618-79965-202").

In one example embodiment, the hashed IDs may be created using a subscriber first name (e.g., the first name of the subscriber obtained from an MSO 120 subscriber dataset), a subscriber entity name or surname (e.g., the last name of the subscriber obtained from the MSO 120 subscriber dataset), street (e.g., the street portion of the address where the service is being provided, which may be obtained from the subscriber dataset), state (e.g., the state portion of the address where the service is being provided, which may be obtained from the subscriber dataset), ZIP code (e.g., the traditional five numeric digits of the zip code of the subscriber), ZIP+4 (e.g., the additional four digits that make up the zip+4 of the subscriber), and an account status (e.g., a current status of the set-top box 113 where, for example, a "0" may indicate the set-top box 113 is inactive and a "1" may indicate the set-top box 113 is active).

Other subscriber data may include: a set top box model (e.g., a field that indicates the type/model of the installed set top box 113), a headend identifier (e.g., a description of the physical location of the headend 110 that serves this set-top box 113), a HUB identifier (e.g., an identifier for the HUB that serves this set-top box 113, where HUBs may correspond to media channel lineups), a node identifier (e.g., an identifier of the physical node 112 that serves this set-top box 113), service flags (e.g., diagnostics reports that DP 130 may provide to MSO 120 and which may include additional data elements that would allow the MSO to refine or filter the reports into sub-segments that will be valuable to the operations and media sales teams, including, for example, high definition (HD) flags, pay/premium channel flags, cable telephony or VoIP flags, broadband flags, etc.), and segmentation codes (e.g., codes provided by one or more TPPs 140 such that a unique household ID is transmitted along with other household or subscriber information throughout the process, where the codes may be further used as filtering for reports).

Further, multiple unique IDs may be created from any given set of name/address combinations. In some embodiments, addresses may be converted into standard postal formats, including, for example, conversion to standard address part abbreviations. Moreover, many permutations of names may be created including all first/last name combinations, first initial/last name, no names (i.e., blanks) and all variations of multiple word entity names or surnames (e.g., Von Trap="Von Trap", "Von", "Trap"). The permutations of IDs created from the combinations of first/last names and addresses may be sent to TPP 140 where, presumably, at least one will match. The matched ID will be the considered the primary unique ID and the others will be aliases. Primary IDs may be stored in a memory cache so that future matches will not need to be run against the aliases until and unless client 150 requires a more thorough match process.

By implementing the process in this manner, the file may be created in human-readable text format. The unique identifiers created will be used to match datasets and provide household demographics by integrating data from TPPs 140. The one or more subscriber files may include one or more generated unique and persistent TPCDP IDs, a zip code where service corresponding to the generated TPCDP IDs is located, a list of all set top box identifiers (e.g., serial numbers, MAC addresses, etc.), and other data for sorting and filtering with no personally identifiable information data included.

The generated subscriber files may be sent to one or more DPs 130 (315). In some embodiments, the generated subscriber files may be transmitted via network 160. In one example embodiment, the generated subscriber files may be uploaded to a network location (e.g., a secure FTP site) associated with DP 130 such that complete sets of fields will be extracted and delivered in a way in that no personally identifiable data is transmitted. In some aspects, the generated subscriber files may be appended and/or consolidated to create a single output file for transmission to DP 130. The generated subscriber file may include the following information and/or data fields:

| Field Name | Description |
| --- | --- |
| MSO Created Household ID | The unique identifier created by the MSO for each household. It is persistent over time so that the data from each household can be examined longitudinally. |
| TPCDP1 Created Household ID | The unique and persistent household identifier created by software associated with one third party consumer data provider (TPCDP1) |
| TPCDP2 Created Household ID | The unique and persistent household identifier created by software associated with another third party consumer data provider (TPCDP2) |
| Set Top Box IDs | A list of unique identifier for each set top box in the household identified |
| Zip | Zip code for the household |
| Zip + 4 | The additional four zip + 4 digits |
| Employee Status | 0 for employee, 1 for non-employee household |
| Account Status | 0 for inactive, 1 for active account |
| Franchise Name | Name for the local franchise |
| Set Top Box Model | The type of set top box |
| Headend ID | Location of the headend connected to this household |
| Hub ID | An identifier of the HUB that serves this household |
| Zone Name | The zone that the household is associated with |
| Node ID | An identifier of the Node that serves this household |
| Services Flags | Flags to indicate the various services that are in use by this household, including HBO, TMC, Cinemax, Showtime, Starz |
| Tier | Service tier |
| HDTV | 0 for SD set top box, 1 for HD set top box |
| Segmentation code | $3^{rd}$ party demographic segmentation code |

Some of the information and/or data fields may be required, while others may be optional. Optional fields may be appended to a specific row of data corresponding to a subscriber. Moreover, the information and/or data fields may be filterable options that can be integrated into one or more other reporting services. The information and/or data fields may exclude or not include viewing data corresponding to the subscriber, and any personally identifiable information may not be combined with viewing information at any point.

Upon receiving the transmitted subscriber files, DP 130 may update its internal database records by storing the subscriber file information in, for example, DP databases 133. DP 130 may also process using, for example, DP servers 135, periodic raw data feeds corresponding to MSO 120 and/or clients 150. DP 130 may create reference files associated with the one or more unique identifiers, such that each set top box 113 is mapped to a single household but no subscriber data is computed.

One or more set-top boxes 112 may transmit set-top box data to a master headend 110 (320). The set-top box data may be sent upon request or may be sent automatically. The master headend 110 may collect the set-top box data each night from set top boxes 112, aggregate the collected set-top box data, and transmit the aggregated set-top box data to DP 130 (325). In some embodiments, the collected data may include viewing data and/or "click" data (e.g., data indicating which channels and/or programs were tuned, data corresponding to the measurable attention paid to an advertisement obtained through, for example, determining a number of times a user clicking on the advertisement, etc.). The aggregated set-top box data may exclude or not include personally identifiable information. In addition, the aggregated set-top box data may be sent to DP 130 on a periodic basis (e.g., monthly, weekly, daily, etc.).

DP 130 may process one or more periodic reports based on the subscriber files and/or aggregated set-top box. Using the aggregated set-top box data, which is free from personally identifiable information, DP 130 may combine all set top box viewing from a single household and apply multi-processing rules to the raw data prior to reporting. DP 130 may transmit the one or more periodic reports to MSO 120 by, for example, posting the one or more periodic reports to a website associated with MSO 120. Optionally, MSO 120 may transmit the one or more periodic reports to one or more clients 150. This process may be repeated on a regular and/or periodic basis.

In some embodiments, DP 130 may send the unique IDs (e.g., TPCDP ID_1, TPCDP ID_2, etc.) to one or more TPPs 140 (335). In such embodiments, TPPs 140 may be configured to provide matching services and/or demographic data. Thus, when the subscriber files are transmitted from MSO 120 to DP 130, DP 130 may extract the unique IDs and send each of the unique IDs to a specific demographic data provider. In return, TPPs 140 may send demographic data to DP 130 (340), and the returned demographic data may be used in reports for MSO 120 and/or in other reporting services. In some embodiments, the matching of IDs could occur entirely within DP 130 based on IDs previously acquired from TPP 140 and stored at DP 130.

As one example, a subscriber file may be generated at the beginning of the month and transmitted from MSO 120 to DP 130. The generated and transmitted may be a clear text file, pipe delimited (|) and free of all personally identifiable information, as shown by the following field string: Household ID|TPCDP_ID|HID|TPCDP_ID2|HHID|Set Top Box IDs|Zip|Zip+4|Status|STB Model|Headend ID|HUB ID|Node ID|HD|Pay Channels|Telephony|Broadband|Segmentation Code. In the example, the last field may end with a "line feed," and not a pipe delimiter. For optional data fields, if the optional data is not included, the two surrounding pipe delimiter may be used without data inserted between (i.e., ||). For example, the data string may appear as follows:

1D12345|A1213|E123|00019f43a8bc|60609|1234|1|DCT-5000|CHICAGO-1|9|Michigan Ave|1|1|0|1|22.

Further, in some embodiments, one or more TPPs 140 may provide DP 130 with household characteristics based solely on the household identifier, and without regard to any personally identifiable information. The data obtained from TPPs 140 by DP 130 may include, for example:

| Field Name | Description |
| --- | --- |
| TPP-created household ID | The household Identifier that was created at MSO 120 using, for example, ID creation software tool created, implemented, and utilized by DP 130 |
| Age/gender of head of household | Age in years and male/female flag |
| Age/gender of second adult in the household | Age in years and male/female flag |
| Presence of children | Flag that indicates children living in the household |
| Language spoken | Primary language spoken within the household |
| Ethnicity | Code indicating ethnicity of head of household |
| Education | Highest level of education for the head of household |
| Household Income | Total (estimated) household income |
| Home ownership status | Home owner/renter flag |

In addition, since information included transmitted throughout this process may be considered sensitive and/or valuable, DP 130 may develop and/or implement one or more mechanisms or procedures to encrypt the data, and receive it through a password protected secure mechanism.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as will be apparent. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood, all language such as "up to," "at least," "greater than," "less than," and the like include the number recited and refer to ranges which can be subsequently broken down into subranges as discussed above. Finally, as will be understood, a range includes each individual member. Thus, for example, a group having 1-3 members refers to groups having 1, 2, or 3 members. Similarly, a group having 1-5 members refers to groups having 1, 2, 3, 4, or 5 members, and so forth.

The foregoing description, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense

The invention claimed is:

1. A computer-implemented method comprising:
    receiving, at a data processor, a first unique identifier (ID) and a first set of data from a multiple system operator, wherein the first unique ID is based on personally identifiable information associated with at least one subscriber and the first unique ID is based on both a one-way hash of the personally identifiable information associated with the at least one subscriber and a cryptographic algorithm, and the first set of data comprises television viewing behaviors of the at least one subscriber;
    sending, the first unique ID to a third party provider of datasets;
    receiving, at the data processor from the third party provider, a second set of data associated with the at least one subscriber, wherein the third party provider generates the second set of data associated with the at least one subscriber by generating a matching unique ID, matching the first unique ID with the matching unique ID, and retrieving the second set of data associated with the matching unique ID;
    appending, at the data processor, the first set of data with the second set of data;
    generating, using the data processor, aggregated viewership data based on the first set of data and the second set of data; and
    sending the aggregated viewership data to one or more clients.

2. The computer-implemented method of claim 1, wherein the second set of data comprises demographic, purchase habits, or behaviors of the at least one subscriber.

3. The computer-implemented method of claim 1, wherein the personally identifiable information comprises one or more combinations of a subscriber name and a subscriber address.

4. The computer-implemented method of claim 1, wherein a secret key is included in the one-way hash of personally identifiable information.

5. The computer-implemented method of claim 1, wherein the first unique ID, the first set of data, and the second set of data are free of personally identifiable information.

6. The computer-implemented method of claim 5, wherein the personally identifiable information includes one or more of a name, an address, a social security number, a date of birth, a credit card number, employment information, and biometric data.

7. A system comprising:
    memory storing data and instructions; and
    at least one processor configured to access the memory and execute the instructions, causing the at least one processor to:
    receive a first unique identifier (ID) and a first set of data from a multiple system operator, wherein the first unique ID is based on personally identifiable information associated with at least one subscriber and the first unique ID is based on both a one-way hash of the personally identifiable information associated with the at least one subscriber and a cryptographic algorithm, and the first set of data comprises television viewing behaviors of the at least one subscriber;
    send the first unique ID to a third party provider system associated with a third party provider of datasets;
    receive, from the third party provider system, a second set of data associated with the at least one subscriber, wherein the third party provider system generates the second set of data associated with the at least one subscriber by generating a matching unique ID matching the first unique ID with the matching unique ID, and retrieving the second set of data associated with the matching unique ID;
    append the first set of data with the second set of data;
    generate aggregated viewership data based on the first set of data and the second set of data; and
    send, over a network, the aggregated viewership data to one or more clients.

8. The system of claim 7, wherein the second set of data comprises demographic, purchase habits, or behaviors of the at least one subscriber.

9. The system of claim 7, wherein the personally identifiable information comprises one or more combinations of a subscriber name and a subscriber address.

10. The system of claim 7, wherein a secret key is included in the one-way hash of personally identifiable information.

11. The system of claim 7, wherein the first unique ID, the first set of data, and the second set of data are free of personally identifiable information.

* * * * *